(No Model.)

A. P. McKEE.
TOOL FOR FINISHING BOTTLES.

No. 563,207. Patented June 30, 1896.

WITNESSES
Geo. M. Anderson
Philip C. Masi.

INVENTOR
A. P. McKee
E. W. Anderson
his Attorney ced by a nut $c'$.

UNITED STATES PATENT OFFICE.

ALEXANDER P. McKEE, OF ANDERSON, INDIANA.

TOOL FOR FINISHING BOTTLES.

SPECIFICATION forming part of Letters Patent No. 563,207, dated June 30, 1896.

Application filed September 7, 1895. Serial No. 561,835. (No model.)

*To all whom it may concern:*

Be it known that I, ALEXANDER P. MCKEE, a citizen of the United States, and a resident of Anderson, in the county of Madison and State of Indiana, have invented certain new and useful Improvements in Tools for Finishing Bottles; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
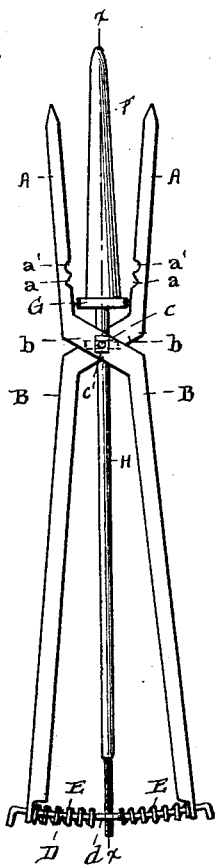
Figure 2:
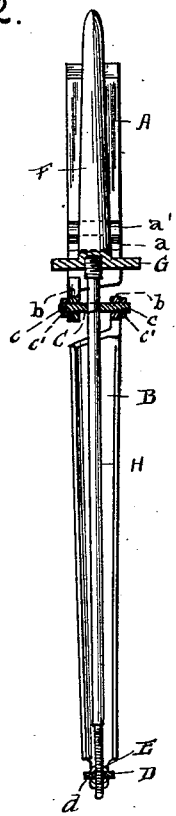

Figure 1 of the drawings is a representation of a side elevation of the invention. Fig. 2 is a section on line $x\,x$, Fig. 1.

The object of this invention is to provide a simple, convenient, and efficient hand-tool for finishing the necks and lips of bottles, jugs, jars, and like articles, and which shall be capable of performing its work in a more complete, uniform, and satisfactory manner than is possible with like tools heretofore employed.

With this object in view the invention consists in the novel construction and combination of parts, all as hereinafter described.

Referring to the accompanying drawings, the letters A A designate the two broad-faced jaws which finish the exterior of the bottle-neck, their working faces having therein the parallel grooves $a\,a'$, the former being usually of angular form to shape the pouring-lip of the bottle, and the latter of arcuate form to shape the swell below said lip. The form of these grooves may, however, be changed to suit the particular work for which the tool is employed. Said jaws A A are carried by the shanks B B, which, instead of being connected at their handle ends by a bow-shaped spring, as in the common construction heretofore, are pivotally connected to each other a short distance behind the jaws. To receive the pivot, each shank is formed with an oblique laterally-reduced portion $b$, which connects the jaw with the shank proper, the two portions crossing each other. The pin or fulcrum $c$ is provided with a central enlargement C, which spaces the two shanks from each other, as shown. This pin may be removable and secured by a nut $c'$.

D designates a yoke, the arms of which work loosely through apertures at the handle ends of the shanks, being curved approximately to the radius of movement and having their extremities bent to form guards to prevent the shanks slipping off the arms. Seated against the inner face of each shank and against a central enlargement $d$ of the yoke are springs E, which are coiled around said lateral arms.

F designates the conical plug which shapes the interior circular passage through the neck. The base of said plug is provided with a plate portion G, against the parallel edges of which the jaws are designed to tightly close, stopping them in substantially parallel relation to each other. Said plug is shown as carried by a rod or shank H, onto which the plug is screwed. Said rod passes loosely through an aperture in the central enlargement C of the fulcrum-pin and between the shanks to the yoke, in the central enlargement $d$ of which it has an adjustable bearing, as indicated.

It will be apparent that the present construction of the shanks affords a better leverage to the hand than does the old construction, enabling it to be held in a much firmer manner to the work, and resulting in a more complete and uniform finish. Owing to the gain in leverage effected by this construction, I am enabled to work with the material in a much stiffer condition than has been possible heretofore, thus effecting a saving in material and an increased production.

Having thus described my invention, what I claim as new, and desire to secure by Letters Patent, is—

In a tool for finishing the necks of bottles and the like, the combination of the broad-faced, grooved jaws having their shanks crossed and pivoted, the transverse yoke D, whose arms work loosely in apertures in the handle ends of the respective shanks, a spring seated between the inner face of each shank and a central enlargement of the yoke, the removable fulcrum-pin $c$, having a central enlargement C which spaces the two shanks from each other, the tapered plug between the jaws, and having a plate portion G at its base against the parallel edges of which the jaws are designed to close tightly, and the shank H which carries said plug and extends loosely through an aperture of the said enlargement C, and also adjustably engages the central enlargement of the yoke D, substantially as specified.

In testimony whereof I affix my signature in presence of two witnesses.

ALEXANDER P. McKEE.

Witnesses:
D. C. CHIPMAN,
M. A. CHIPMAN.